United States Patent [19]
Biltcliffe et al.

[11] 3,839,689
[45] Oct. 1, 1974

[54] DETACHABLE LEADS FOR A SUPERCONDUCTING MAGNET

[76] Inventors: Michael Norfolk Biltcliffe, 204 Barry Ave., Bicester; Peter Edward Hanley, 122 Botley Rd., Oxford; James Barry McKinnon, 145 Farmers Close, Witney; Roger William Wheatley, 3 Welford Gardens, Abingdon, all of England

[22] Filed: Jan. 8, 1973

[21] Appl. No.: 321,954

[30] Foreign Application Priority Data
Jan. 12, 1972  Great Britain.................. 1422/72

[52] U.S. Cl............ 335/216, 339/88 R, 174/DIG. 6
[51] Int. Cl............................................ H02f 7/22
[58] Field of Search................ 335/216; 174/DIG. 6; 339/67, 88 R

[56] References Cited
UNITED STATES PATENTS

| | | | |
|---|---|---|---|
| 3,015,960 | 1/1962 | Steele | 335/216 X |
| 3,280,350 | 10/1966 | Gebel | 335/216 X |
| 3,551,861 | 12/1970 | Boom et al. | 335/216 |

*Primary Examiner*—G. Harris
*Attorney, Agent, or Firm*—Larson, Taylor & Hinds

[57] ABSTRACT

A superconducting magnet coil has current supplied thereto through external connection leads. In the persistent current mode the leads are superfluous since current circulation is maintained by a superconducting link across the coil. Accordingly to prevent heat losses by heat conduction through the leads they have joints so that the leads can be detached from the coil by manipulation from outside the cryostat thus enabling the leads to be completely removed when the magnet is in use. The joints in the leads may comprise screw-threaded male and female members or else plug and socket members. In either case provision is made for re-attachment of the leads from outside the cryostat without interruption of the persistent current.

8 Claims, 2 Drawing Figures

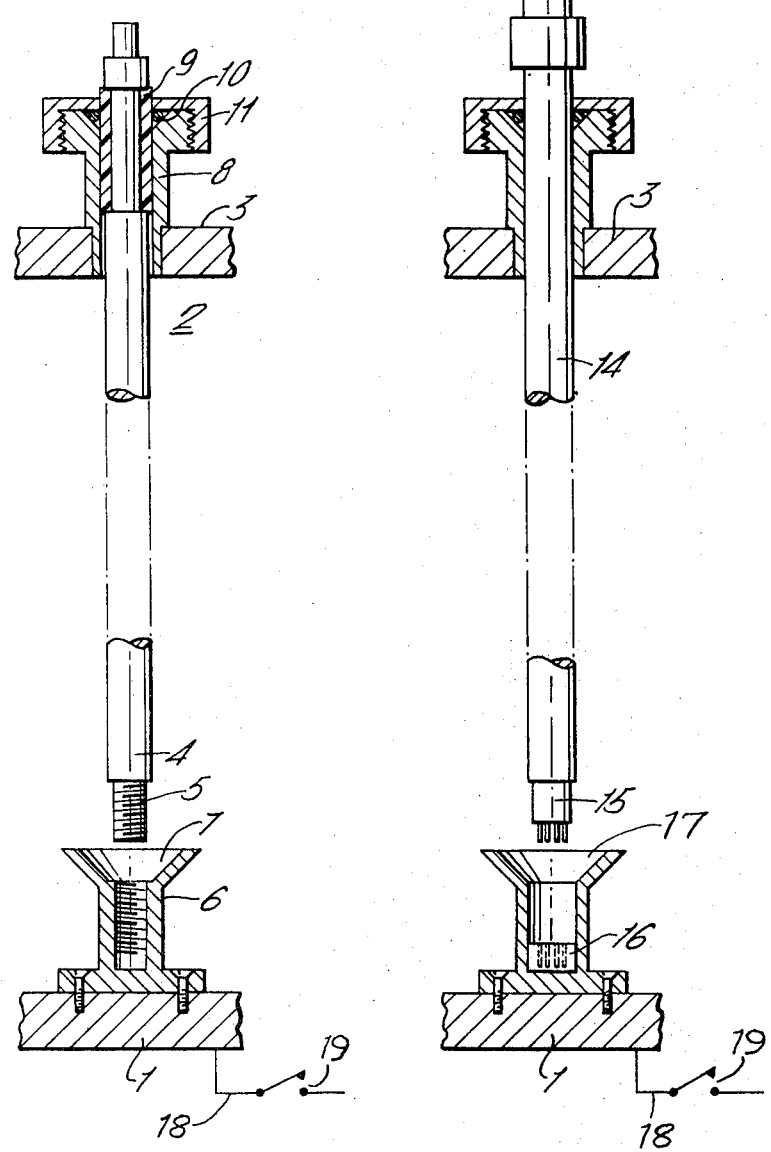

DETACHABLE LEADS FOR A SUPERCONDUCTING MAGNET

This invention relates to superconducting magnets and leads therefor.

Such magnets are often required to provide a stable magnetic field continuously over a long period of time. An example of such a requirement is in nuclear magnetic resonance spectrometers in which it is desirable to maintain a constant magnetic field between measurements without the need to make adjustments to the magnetic field by field shimming whenever the magnet current is switched on again. One method of meeting this requirement is to allow persistent current to be maintained in the magnet by means of a superconducting link connected across the magnet coil. By providing a small heater in thermal contact with the link it operates as a switch which is held open by supplying current to the heater to raise the temperature of the link to a level at which it becomes normal. The switch is held open in this way while current is fed to the magnet from an external source. When the desired magnitude of current is passing through the magnet the heater is switched off to allow the link to become superconducting and thus act as a closed switch and provide a path for persistent current of the desired magnitude to circulate through the magnet. With such an arrangement the magnet dissipates no energy and will continue to function indefinitely without the need for an external current supply provided that the cryostat within which it is placed continues to be maintained at the requisite low temperature. Thus the only losses in operation of the magnet are the losses of liquid helium due to heat conduction into the cryostat. It is desirable therefore to minimise these heat losses as much as possible.

According to the present invention a superconducting magnet comprises a cryostat containing a superconducting coil designed to carry current and generate a magnetic field, a short-circuiting superconducting link connected across the coil to enable current in the coil to persist, and electrical current supply leads extending through the cryostat to the coil which leads have joints in them to enable the leads to be detached from the coil without interrupting persistent current and thus reduce heat conduction to the cryostat through the leads.

Preferably the joints are positioned close to the coil and are arranged so that the leads can be readily detached and re-attached to the coil from outside the cryostat. Where the leads are designed to pass heavy currents the joints may comprise co-operating screw-threaded male and female members and to assist in location of the two members when re-attaching the leads the female members can have bell-mouth openings.

For lighter currents the joints may take the form of plug and socket members in which case the leads should be rigid or be enclosed in a rigid casing. A plug and socket arrangement is particularly suitable for connecting several conductors. To aid in location of the plug and socket members the socket members can have bell-mouth openings.

In carrying out the invention gas-tight seals may be provided where the leads pass through the outer wall of the cryostat. After removal of the leads the resulting openings can be enclosed by gas-tight caps.

In order that the invention may be more fully understood reference will now be made to the accompanying drawing in which:

FIG. 1 and FIG. 2 illustrate an arrangement of detachable leads for a superconducting magnet.

Referring now to FIG. 1 there is shown therein part of a superconducting magnet coil 1 contained within a cryostat 2 having an outer insulating wall 3. An electrical current supply lead 4 extends through wall 3 to make contact with coil 1. Lead 4 includes a joint consisting of a male member 5 and a female member 6 which have co-operating screw-threads by which member 5 can be secured to member 6 by rotation of lead 4 from a remote position. To assist in location of member 5 in member 6 member 6 is provided with a bell-mouth opening 7.

A joint constructed as described above has a low electrical resistance and is particularly suitable for passage of the heavy currents that are required to energise the coil of a superconducting magnet.

Where lead 4 passes through the outer wall 3 of cryostat 2 it is necessary to make a gas-tight connection to prevent escape of boiled off helium from the cryostat. A tubular insert 8 is provided in wall 3 and an insulating sleeve 9 surrounds that part of lead 4 which is designed to lie within the bore of insert 8. Sleeve 9 is a close fit in the bore. The gas-tight seal is completed by means of an O-ring 10 which is tightened between insert 8 and sleeve 9 by a threaded flanged ring 11 when secured down on insert 8.

To detach lead 4 from the cryostat ring 11 is unscrewed and then lead 4 is rotated and lifted out through the bore of insert 8. To reform the gas-tight seal a cap having a generally similar shape to ring 11 is then screwed down on insert 8. To re-connect lead 4 the operation is reversed and it will be seen that the lowering of lead 4 through the bore of insert 8 and into the bell-mouth opening 7 allows the screw threads of members 5 and 6 to mate and the connection made by rotating lead 4.

FIG. 2 shows an arrangement which is generally similar to FIG. 1 and like parts have like reference numerals except that in place of a single current lead 4 capable of carrying a heavy current a multi-conductor lead 14 is provided which terminates in a plug member 15. A socket member 16 to match plug member 15 is secured to the magnet coil 1. With this arrangement it is necessary for lead 14 to be rigid so that direct entry of the pins of plug member 15 can be made into the corresponding socket of socket member 16. Socket member 16 has a bell-mouth opening 17 to aid location of plug member 15 therein. The arrangement for ensuring a gas-tight seal where lead 14 passes through the outer wall 3 of the cyostat is similar to the arrangement illustrated in FIG. 1 except that if lead 14 has an insulating cover no special insulating sleeve is required around it.

The arrangement of FIG. 2 is suitable for leads connected to ancillary devices such as field shimming coils. In the arrangements of both FIG. 1 and FIG. 2 it will be understood that a second lead to the coil 1 similar to the one illustrated will also be provided. A short-circuiting superconducting link 18 is connected across coil 1 to enable current in the coil to persist when the leads are detached. Link 18 includes a switch 19 which is open when coil 1 is initially fed with current through the leads.

By use of the detachable leads described above the coil of a superconducting magnet can be initially fed with the requisite current and then switched to the persistent current mode. The leads now no longer have any function and merely serve to increase the heat conduction through the cryostat particularly as the material forming the electrical conductors of the leads will usually also be good conductors of heat. The leads can therefore be detached from the magnet while the magnet continues to function and this source of loss is thus eliminated.

We claim:

1. A superconducting magnet comprising a cryostat containing a superconducting coil designed to carry current and generate a magnetic field, a short-circuiting superconducting link connected across the coil to enable current in the coil to persist, and electrical current supply leads extending through the cryostat to the coil, said leads including joints therein positioned within the cryostat for enabling the leads to be detached from the coil and removed from the cryostat without interrupting persistent current and thus reduce heat conduction to the cryostat through the leads.

2. The magnet as claimed in claim 1 in which the joints are positioned close to the coil and are arranged so that the leads can be readily detached and re-attached to the coil from outside the cryostat.

3. The magnet as claimed in claim 1 in which the joints comprise co-operating screw-threaded male and female members.

4. The magnet as claimed in claim 3 in which the female members have bell mouth openings to assist in location of the members when re-attaching the leads.

5. The magnet as claimed in claim 1 in which the joints comprise plug and socket members.

6. The magnet as claimed in claim 5 in which the socket members have bell mouth openings to assist in location of the members when re-attaching the leads.

7. The magnet as claimed in claim 1 in which gas-tight seals are provided where the leads pass through the outer wall of the cryostat.

8. The magnet as claimed in claim 7 in which the gas-tight seals are provided with means for enabling caps to be secured thereto in a gas-tight manner after removal of the leads.

* * * * *